(12) United States Patent
Mullangath

(10) Patent No.: US 8,732,568 B1
(45) Date of Patent: May 20, 2014

(54) SYSTEMS AND METHODS FOR MANAGING WORKFLOWS

(75) Inventor: Sinoj Mullangath, Pune (IN)

(73) Assignee: Symantec Corporation, Mountain View, CA (US)

(*) Notice: Subject to any disclaimer, the term of this patent is extended or adjusted under 35 U.S.C. 154(b) by 89 days.

(21) Appl. No.: 13/233,255

(22) Filed: Sep. 15, 2011

(51) Int. Cl.
G06F 17/00 (2006.01)

(52) U.S. Cl.
USPC .......................................... 715/200; 715/255

(58) Field of Classification Search
USPC ................................................. 715/200, 255
See application file for complete search history.

(56) References Cited

U.S. PATENT DOCUMENTS

| | | | |
|---|---|---|---|
| 6,647,533 B1* | 11/2003 | Liu et al. | 715/206 |
| 6,889,375 B1* | 5/2005 | Chan et al. | 717/123 |
| 6,895,573 B2* | 5/2005 | Nørgaard et al. | 717/100 |
| 7,519,917 B2* | 4/2009 | Lewis-Bowen et al. | 715/772 |
| 7,661,061 B2* | 2/2010 | Joshi | 715/205 |
| 7,783,972 B2* | 8/2010 | Camps et al. | 715/255 |
| 7,917,467 B2* | 3/2011 | Kemmer et al. | 707/609 |
| 8,185,463 B1* | 5/2012 | Ball | 705/36 R |
| 8,204,847 B2* | 6/2012 | Kumar et al. | 706/62 |
| 8,261,233 B2* | 9/2012 | Szpak et al. | 717/105 |
| 8,370,293 B2* | 2/2013 | Iwase et al. | 707/608 |
| 8,538,793 B2* | 9/2013 | Kunti et al. | 705/7.27 |
| 2003/0079175 A1* | 4/2003 | Limantsev | 715/500 |
| 2004/0172586 A1* | 9/2004 | Ragnet et al. | 715/500 |
| 2004/0243699 A1* | 12/2004 | Koclanes et al. | 709/224 |
| 2005/0248804 A1* | 11/2005 | Goel et al. | 358/1.15 |
| 2005/0283455 A1* | 12/2005 | Kemmer et al. | 707/1 |
| 2008/0034275 A1* | 2/2008 | Edd et al. | 715/200 |
| 2009/0174726 A1* | 7/2009 | Ollivier | 345/600 |
| 2009/0307570 A1* | 12/2009 | Hirata | 715/200 |
| 2011/0153555 A1* | 6/2011 | Falkenberg et al. | 707/608 |
| 2011/0179371 A1* | 7/2011 | Kopycinski et al. | 715/772 |
| 2011/0201900 A1* | 8/2011 | Zhang et al. | 600/300 |
| 2011/0202841 A1* | 8/2011 | Dempster et al. | 715/716 |
| 2012/0158165 A1* | 6/2012 | Bohm et al. | 700/97 |
| 2013/0173324 A1* | 7/2013 | Lo et al. | 705/7.15 |
| 2013/0212507 A1* | 8/2013 | Fedoseyeva et al. | 715/765 |

OTHER PUBLICATIONS

Deneke et al., Towards a Domain-Specific Modeling Language for Customer Data Integration Workflow, IEEE 2008, pp. 49-56.*
Zhang et al., Web Services Enabled Text Categorization System: Service Infrastructure Designing, Google 2007, pp. 73-77.*

(Continued)

Primary Examiner — Cong-Lac Huynh
(74) Attorney, Agent, or Firm — ALG Intellectual Property, LLC

(57) ABSTRACT

A method for managing a multi-stage workflow may include: 1) displaying representations of the plurality of stages of the multi-stage workflow to the user via a graphical user interface, each representation of a workflow stage from the plurality of stages indicating a completion status of the workflow stage; 2) receiving, at a first stage in the multi-stage workflow, input from the user; 3) determining that the input from the user at the first stage affects a second stage in the multi-stage workflow; 4) in response to determining that the input from the user affects the second stage, changing a completion status of the second stage to an updated completion status; and 5) in response to changing the completion status of the second stage, modifying a representation of the second stage such that the representation of the second stage indicates to the user the updated completing status of the second stage.

20 Claims, 7 Drawing Sheets

(56) References Cited

OTHER PUBLICATIONS

Quon, Evaluating Workflow Management System for fMRI Processing, Google 2008, pp. 1-13.*

Georgakopoulos et al., An Overview of Workflow Management: from Process Modeling to Workflow Automation Infrastructure, Google 1995, pp. 119-153.*

Medina-Mora et al., The Action Workflow Approach to Workflow Management Technology, ACM 1992, pp. 280-287.*

Kurdel et al., Grid Workflows Specification and Verification, Google 2008, pp. 1199-1208.*

Wang et al., Generating Workflow Models from OWL-S Service Descriptions with a Partial-Order Plan Construction, IEEE 2011, pp. 1-2.*

* cited by examiner

SYSTEMS AND METHODS FOR MANAGING WORKFLOWS

BACKGROUND

Workflows and wizards may help users work through processes that involve numerous steps and/or multiple requests for user input. Unfortunately, with traditional workflows, users may not understand the impact that an action in one step of a workflow may have on other steps of the workflow. As a result, users may waste a significant amount of time trying to figure out how to complete a workflow, and may experience significant frustration, when they make certain changes to the workflow that affect other parts of the workflow. What is needed, therefore, is a more efficient and effective mechanism for managing workflows.

SUMMARY

As will be described in greater detail below, the instant disclosure generally relates to systems and methods for managing workflows. A computer-implemented method for managing workflows may include: 1) managing a multi-stage workflow that presents a user with a plurality of sequential stages to be completed by the user; 2) displaying representations of the plurality of stages of the multi-stage workflow to the user via a Graphical User Interface (GUI), each representation of a workflow stage from the plurality of stages indicating a completion status of the workflow stage; 3) receiving, at a first stage in the multi-stage workflow, input from the user; 4) determining that the input from the user at the first stage affects a second stage in the multi-stage workflow; 5) in response to determining that the input from the user affects the second stage, changing a completion status of the second stage to an updated completion status; and 6) in response to changing the completion status of the second stage, modifying a representation of the second stage such that the representation of the second stage indicates to the user the updated completion status of the second stage.

The updated completion status of the second stage may reflect one or more of a variety of different states of the second stage. For example, the updated completion status may indicate that the second stage is incomplete, and the representation of the second stage, after being modified, may indicate to the user that the second stage is incomplete and should be visited by the user. Alternatively, determining that the input from the user at the first stage affects a second stage in the multi-stage workflow may include determining that the second stage should be added to the multi-stage workflow. In such embodiments, changing the completion status of the second stage may include adding the second stage to the multi-stage workflow, and modifying the representation of the second stage may include adding the representation of the second stage to the representations of the plurality of stages of the multi-stage workflow such that the representation of the second stage is visible to the user via the GUI.

Additionally or alternatively, determining that the input from the user at the first stage affects a second stage in the multi-stage workflow may include determining, based on the input from the user, that the second stage should be removed from the multi-stage workflow. In such embodiments, changing the completion status of the second stage may include removing the second stage from the multi-stage workflow, and modifying the representation of the second stage may include removing the representation of the second stage from the representations of the plurality of stages of the multi-stage workflow such that the representation of the second stage is no longer visible to the user via the GUI.

In certain embodiments, the second stage may come before the first stage in a sequence of the multi-stage workflow, such that a user had visited the second stage before visiting the first stage. For example, the method may further include, prior to receiving the input from the user at the first stage in the multi-stage workflow, receiving input from the user at the second stage in the multi-stage workflow, and in response to receiving the input from the user at the second stage in the multi-stage workflow, changing a completion status of the second stage to complete. In some embodiments, the method may also include determining that the input from the user at the first stage affects a third stage in the multi-stage workflow, where the third stage comes after the first stage in a sequence of the multi-stage workflow and the second stage comes before the first stage in the sequence of the multi-stage workflow. The method may also include, in response to determining that the input from the user affects the third stage, changing a completion status of the third stage to an updated completion status, and in response to changing the completion status of the third stage, modifying a representation of the third stage such that the representation of the third stage indicates to the user the updated completion status of the third stage.

The method may additionally include determining that the input from the user at the first stage affects a plurality of stages before the first stage in the sequence of the multi-stage workflow and a plurality of stages after the first stage in the sequence of the multi-stage workflow. In such embodiments, determining that the input from the user at the first stage affects the plurality of stages before the first stage may include determining that the input from the user affects the second stage. Furthermore, determining that the input from the user at the first stage affects the plurality of stages after the first stage may include determining that the input from the user affects the third stage. The method may also include, in response to determining that the input from the user affects the plurality of stages before and after the first stage, changing a completion status of each of the stages in the plurality of stages before and after the first stage to the updated completion status, where changing the completion status of each of the stages in the plurality of stages comprises changing the completion status of the second and third stages.

The method may include, in response to changing the completion status of each of the stages in the plurality of stages, modifying a representation of each of the stages in the plurality of stages such that the representations of each stage in the plurality of stages indicates to the user the updated completion status of each of the stages in the plurality of stages. In such embodiments, modifying the representation of each of the stages in the plurality of stages may include modifying the representations of the second and third stages.

In a variety of embodiments, the method for managing workflows may further include, in response to determining that the input from the user affects the second stage, informing the user of a sequence of stages that the user needs to revisit to complete the multi-stage workflow. In such embodiments, the sequence of stages may identify the second stage, and the sequence of stages may identify an order in which the user should revisit the stages identified in the sequence of stages.

In certain embodiments, the method may further include determining that the input from the user at the first stage completes the first stage. The method may also include, in response to determining that the input from the user completes the first stage, changing a completion status of the first stage to completed, and in response to changing the completion status of the first stage to completed, modifying a representation of the first stage such that the representation of the first stage indicates to the user the completed status of the first stage. In such embodiments, modifying the representation of the second stage may include changing the representation of the second stage to a first color that indicates that the second stage was previously visited by the user but needs to be revisited by the user, modifying the representation of the first stage may include changing the representation of the first stage to a second color that indicates that the first stage is completed, and a representation of a third stage may include a third color that indicates the third stage has not been visited by the user and is not completed.

According to various embodiments, a system for managing workflows may include: 1) a management module programmed to manage a multi-stage workflow that presents a user with a plurality of sequential stages to be completed by the user; 2) a display module programmed to display representations of the plurality of stages of the multi-stage workflow to the user via a Graphical User Interface (GUI), each representation of a workflow stage from the plurality of stages indicating a completion status of the workflow stage; 3) an input module programmed to receive, at a first stage in the multi-stage workflow, input from the user; 4) a determination module programmed to determine that the input from the user at the first stage affects a second stage in the multi-stage workflow; and 5) an update module programmed to, in response to determining that the input from the user affects the second stage, change a completion status of the second stage to an updated completion status. The display module may also be programmed to, in response to the completion status of the second stage being changed, modify a representation of the second stage such that the representation of the second stage indicates to the user the updated completion status of the second stage.

In certain embodiments, a computer-readable-storage medium may include one or more computer-executable instructions that, when executed by at least one processor of a computing device, cause the computing device to: 1) manage a multi-stage workflow that presents a user with a plurality of sequential stages to be completed by the user; 2) display representations of the plurality of stages of the multi-stage workflow to the user via a Graphical User Interface (GUI), each representation of a workflow stage from the plurality of stages indicating a completion status of the workflow stage; 3) receive, at a first stage in the multi-stage workflow, input from the user; 4) determine that the input from the user at the first stage affects a second stage in the multi-stage workflow; 5) in response to determining that the input from the user affects the second stage, change a completion status of the second stage to an updated completion status; and 6) in response to changing the completion status of the second stage, modify a representation of the second stage such that the representation of the second stage indicates to the user the updated completion status of the second stage.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
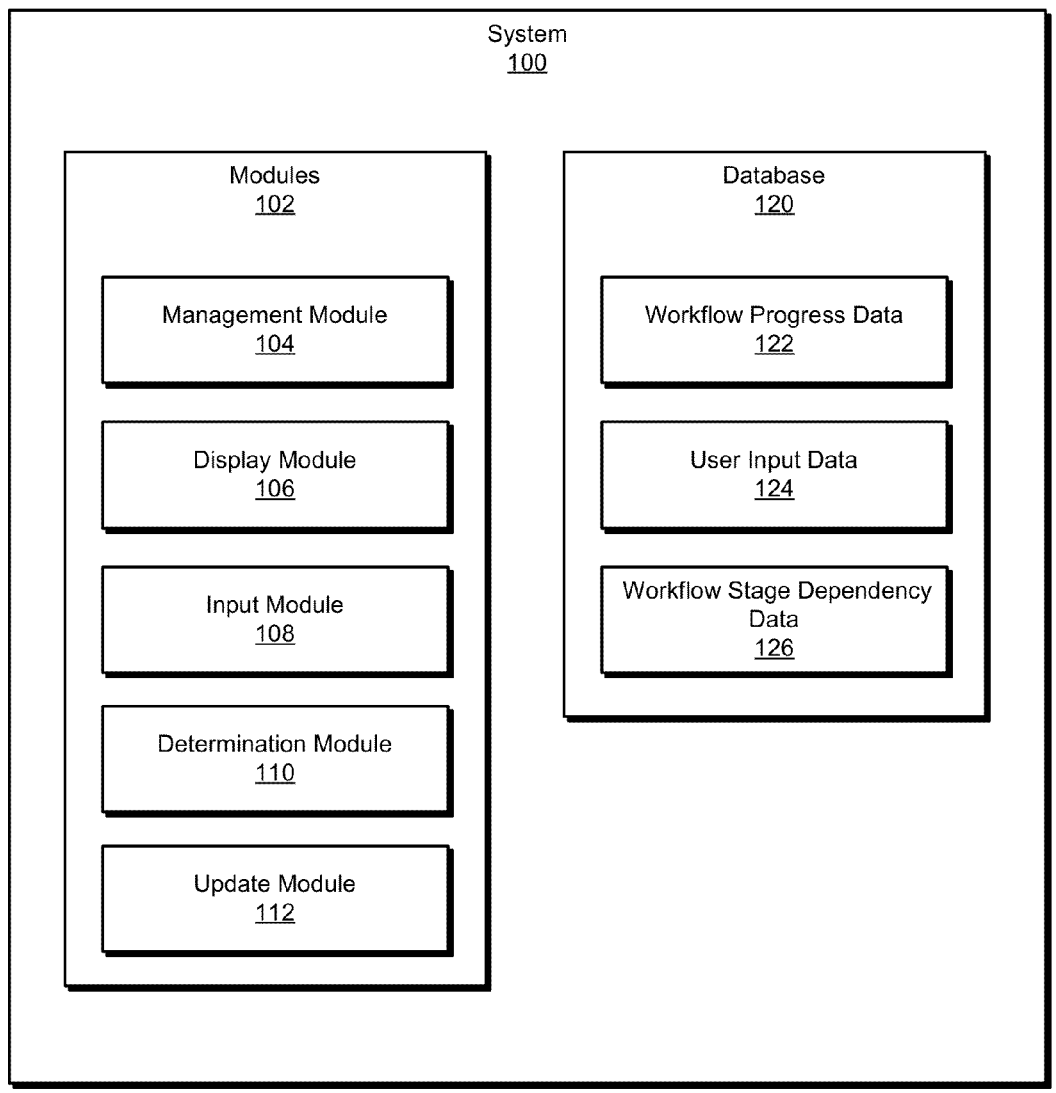
FIG. 1 is a block diagram of an exemplary system for managing workflows.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure provides methods and systems for managing workflows. Embodiments disclosed herein may help users manage workflows by providing users with an intuitive visual interface that may show overall progress of a workflow and/or may indicate how user input affects the workflow. For example, if a user makes a change to a previously completed step in a workflow, embodiments of the instant disclosure may update visual representations of other previously-completed steps in the workflow to cue the user to revisit those steps.

Figure 2:
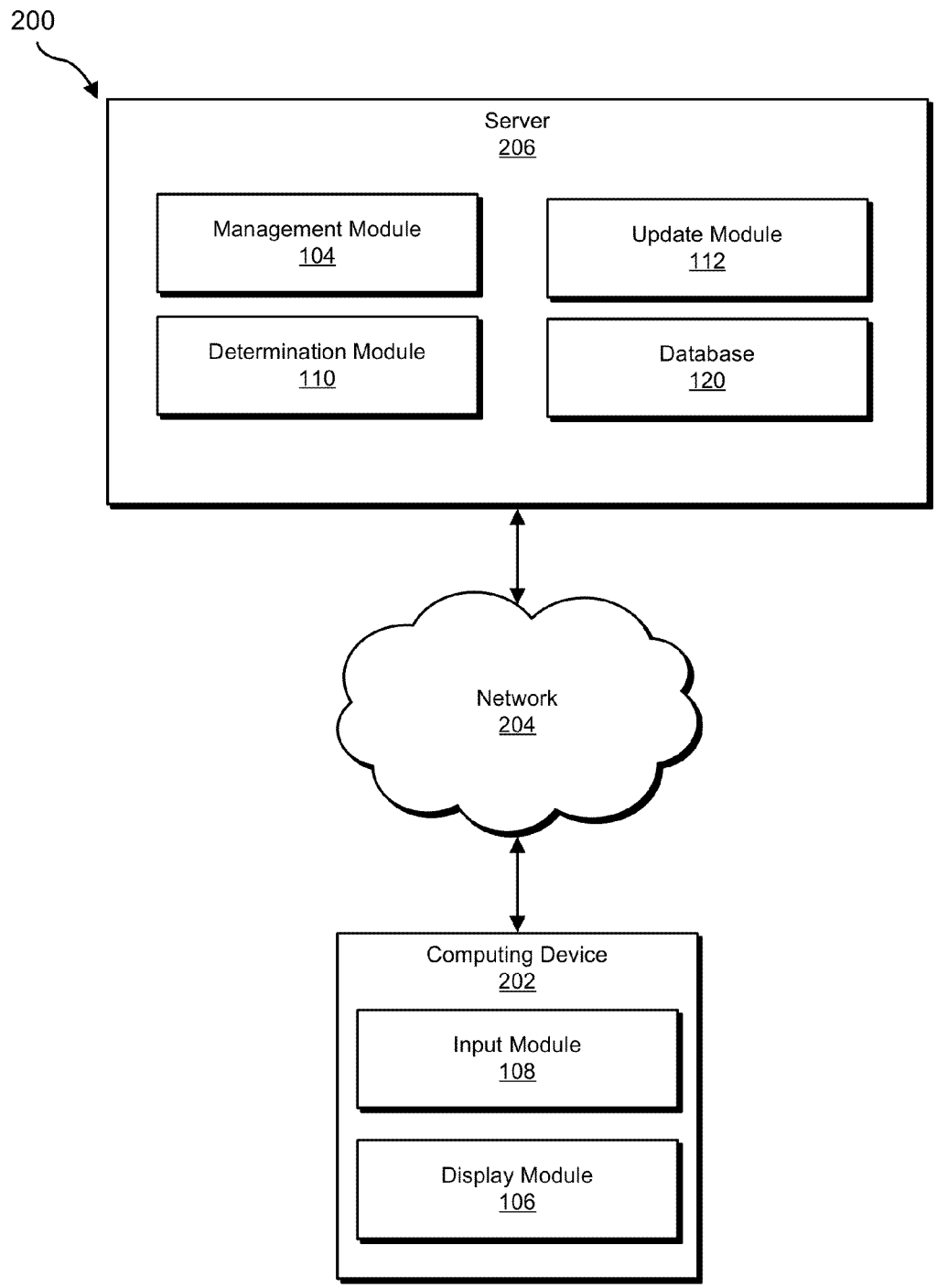
FIG. 2 is a block diagram of another exemplary system for managing workflows.

The following will provide, with reference to FIGS. 1-2, detailed descriptions of exemplary systems for managing workflows. Detailed descriptions of corresponding computer-implemented methods will also be provided in connection with FIG. 3. The description corresponding to FIGS. 4 and 5 explains exemplary embodiments of workflow management. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for managing workflows. As illustrated in this figure, exemplary system 100 may include one or more modules 102 for performing one or more tasks. For example, and as will be explained in greater detail below, exemplary system 100 may include a management module 104 programmed to manage a multi-stage workflow that presents a user with a plurality of sequential stages to be completed by the user. Exemplary system 100 may also include a display module 106 programmed to display representations of the plurality of stages of the multi-stage workflow to the user via a Graphical User Interface (GUI), where each representation of a workflow stage from the plurality of stages indicates a completion status of the workflow stage.

In addition, and as will be described in greater detail below, exemplary system 100 may include an input module 108 programmed to receive, at a first stage in the multi-stage workflow, input from the user. System 100 may also include a determination module 110 programmed to determine that the input from the user at the first stage affects a second stage in the multi-stage workflow. System 100 may further include an update module 112 programmed to, in response to determining that the input from the user affects the second stage, change a completion status of the second stage to an updated completion status.

In some embodiments, display module 106 may be programmed to, in response to update module 112 changing the completion status of the second stage, modify a representation of the second stage such that the representation of the second stage indicates to the user the updated completion status of the second stage. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store workflow progress data 122, user input data 124, and/or workflow stage dependency data 126. Workflow progress data 122 may include data that tracks the progress of a workflow and may be used by display module 106 in providing visual indicators to a user. User input data 124 may include any input received from a user, and workflow stage dependency data 126 may include any information and/or database dependencies that indicate how a change and/or input to one stage of a multi-stage workflow affects one or more other stages of a multi-stage workflow.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

In one embodiment, one or more of modules 102 from FIG. 1 may, when executed by at least one processor of computing device 202, enable computing device 202 to managing workflows. For example, and as will be described in greater detail below, input module 108 may cause computing device 202 to receive input from a user. Computing device 202 may also include display module 106, which may cause computing device 202 to display a multi-stage workflow to the user via a graphical interface of computing device 202.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

In some embodiments, and as illustrated in FIG. 2, computing device 202 may communicate with server 206 to manage workflows. Server 206 may include management module 104, which may cause server 206 to manage user workflows on computing device 202. Server 206 may also include determination module 110, update module 112, and database 120, which may cause server 206 to perform various workflow management functions described above in the description of FIG. 1 and in greater detail below. Examples of server 206 include, without limitation, application servers and database servers configured to provide various database services and/or run certain software applications.

While FIG. 2 shows management module 104, determination module 110, update module 112, and database 120 on server 206, one or more of these modules and/or data structures may be located on computing device 202 and/or on another, different computing device or server remote from computing device 202 and server 206. Furthermore, one or both of input module 108 and display module 106 may be located on server 206.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
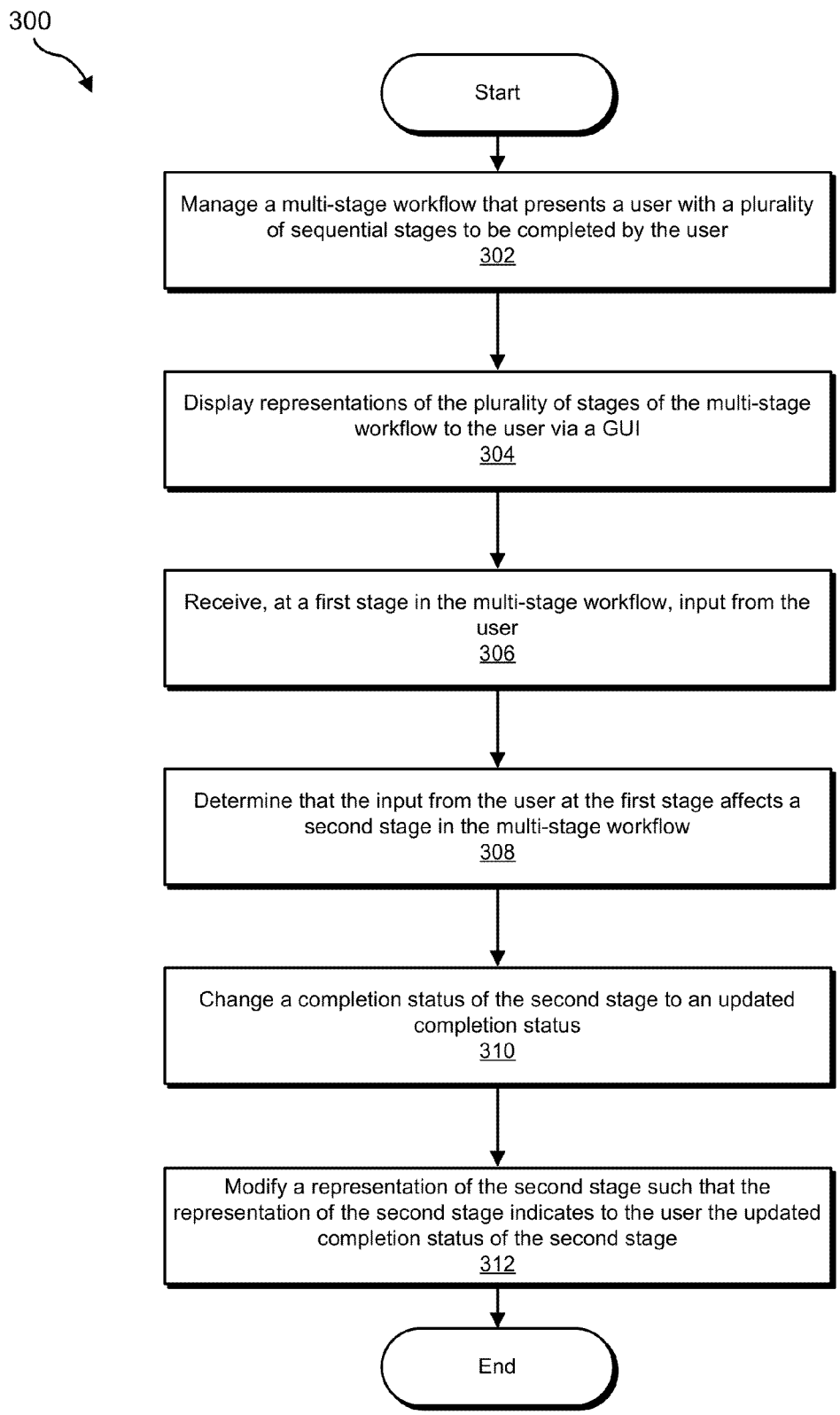
FIG. 3 is a flow diagram of an exemplary method for managing workflows.

FIG. 3 is a flow diagram of an exemplary computer-implemented method 300 for managing workflows. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

At step 302 in FIG. 3, one or more of the systems described herein may manage a multi-stage workflow that presents a user with a plurality of sequential stages to be completed by the user. For example, management module 104 in FIG. 1 (which may, as detailed above, represent a portion of server 206 in FIG. 2) may manage a multi-stage workflow that presents a user with a plurality of sequential stages to be completed by the user. Management module 104 may manage workflows in a variety of different manners and/or contexts.

Management module 104 may manage multi-stage workflows in a variety of ways. For example, management module 104 may be responsible for presenting workflow stages to a user via windows of a graphical user interface, for receiving input from a user, for handling interrelationships between workflow stages, and/or may be responsible for any other task associated with guiding a user through a multi-stage workflow.

Management module 104 may be part of any suitable workflow manager and/or wizard for taking a user through multiple steps to accomplish one or more of a variety of tasks. For example, management module 104 may manage various types of workflows, such as a wizard that helps a user set up a firewall, a wizard that enables a user to establish parental-control policies, a workflow that helps a user define backup copy and/or archiving settings, a wizard that takes the user through multiple steps of installing of a software program, a wizard that helps a user establish data-loss-prevention policies, a wizard that guides a user through setting up an antivirus program, and/or any other type of workflow for accomplishing any other type of task.

As used herein, the term "workflow" generally refers to any sequence of two or more connected steps. In some embodiments, a workflow may be an abstraction of a user's physical work that models the physical work (e.g., a workflow that takes a user through the steps of putting together a piece of furniture, a workflow that helps a user manually configure a piece of industrial equipment, etc). In other words, a workflow may be a pattern of activity described by a systematic organization of resources, information flows, and/or other data that provide a work process capable of being followed by a user.

In other embodiments, workflows may include wizards. The steps of a wizard may accomplish one or more tasks on a computer based on input from the user. For example, a wizard may configure software and/or hardware of a computing system and/or network. In such embodiments, the term workflow generally refers to a process of capturing human-computer interactions over a sequence of steps or stages.

As used herein, the phrase "sequential stages" generally refers to any sequence of two or more stages within a workflow. Any set of two or more sequential stages may be performed in series (e.g., one after another) or in parallel (e.g., simultaneously). A stage within a workflow may include a set of instructions to a user for performing a particular portion of a task, a request for one or more particular items of data and/or selections from a user, and/or any other type of information that may be useful to a user completing a workflow. In some embodiments, a workflow stage may be represented by a window in a GUI that is presented to the user. In such embodiments, as a user proceeds through a workflow, the user may be presented with a new window for each stage of a workflow. When a user is currently working on a stage of a workflow, a window associated with that stage may be active (e.g., in the foreground of the GUI) while windows associated with other stages may be inactive (e.g., in the background of the GUI).

A user may complete a stage of a workflow by entering information into a workflow stage (e.g., entering information in a data field of a window), by choosing one or more of a plurality of selections requested by the workflow stage (e.g., selecting one or more items in a dropdown menu, clicking a radio button, etc.) by performing a physical task and providing input to the workflow indicating that the task was completed, and/or in any other suitable manner.

At step 304 in FIG. 3, one or more of the systems described herein may display representations of the plurality of stages of the multi-stage workflow to the user via a GUI. For example, display module 106 (which may, as detailed above, be part of system 100 in FIG. 1 and/or server 206 in FIG. 2) may display representations of a plurality of stages of multi-stage workflows to the user via a GUI. Each representation of a workflow stage from the plurality of stages may indicate a completion status of the workflow stage.

Figure 4:
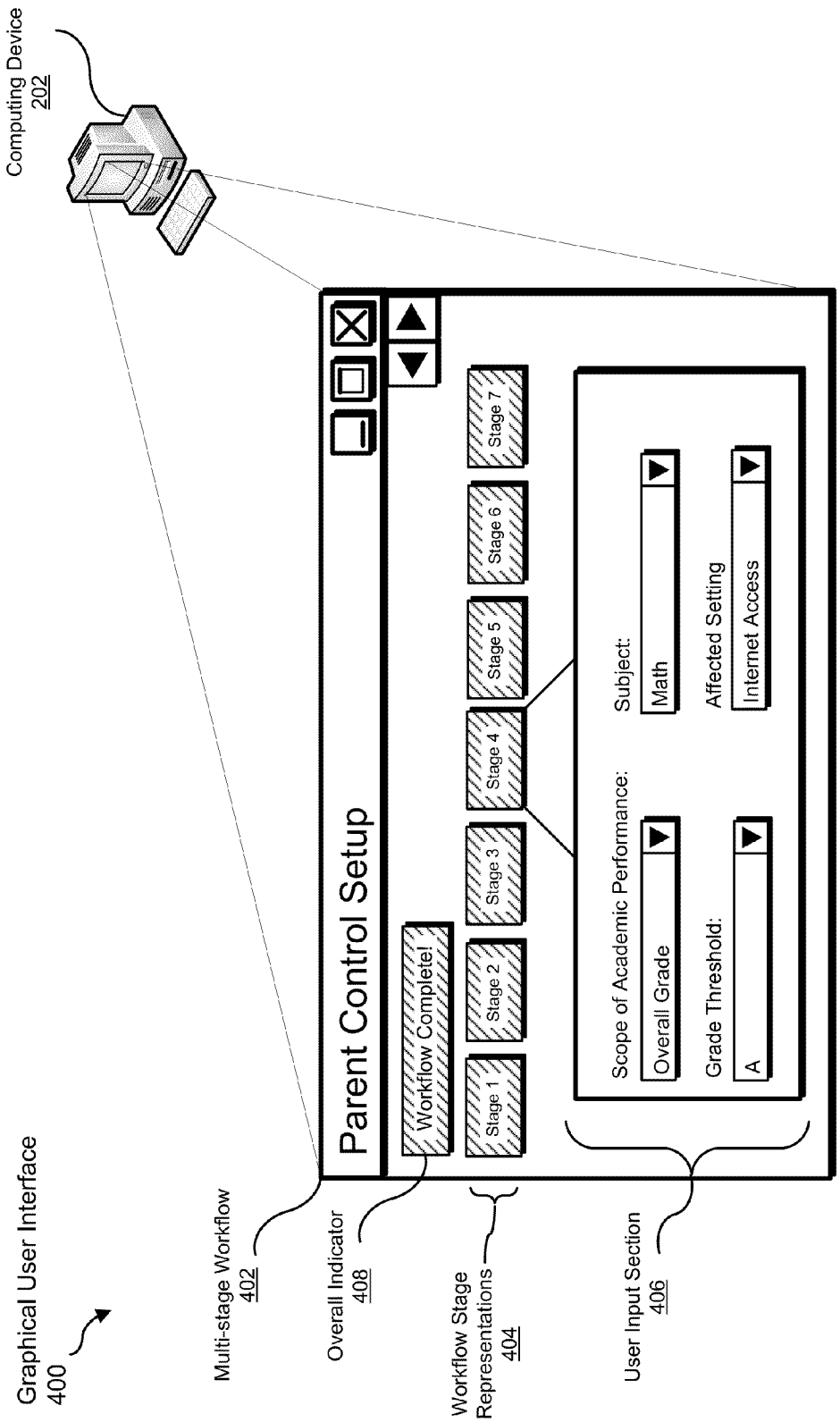
FIG. 4 is a block diagram of an exemplary graphical user interface displaying a multi-stage workflow.
Figure 5:
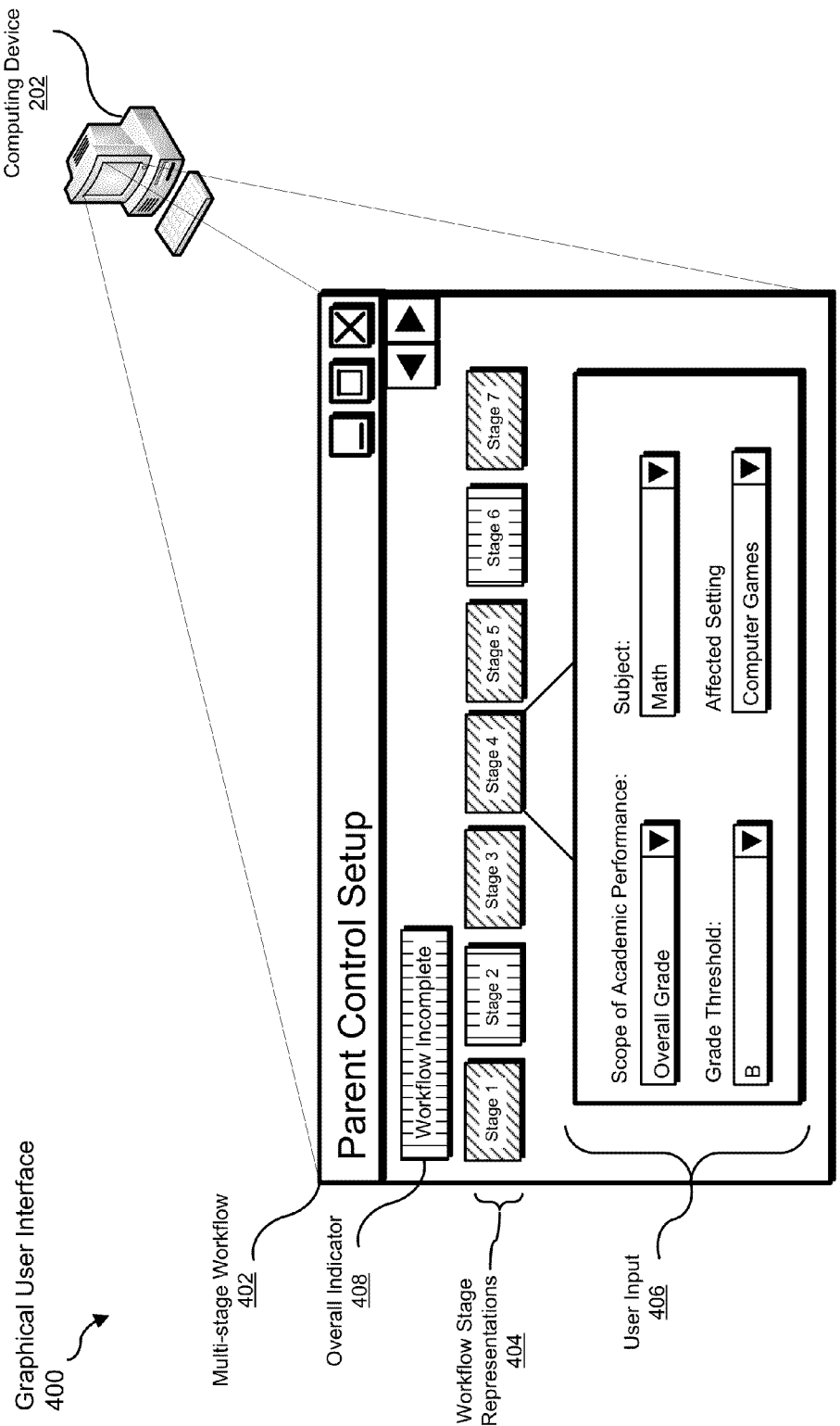
FIG. 5 is another block diagram of the exemplary graphical user interface shown in FIG. 4.

FIGS. 4 and 5 provide an example of a Graphical User Interface (GUI) 400 that displays a multi-stage workflow 402 on computing device 202. Multi-stage workflow 402 may display workflow stage representations 404 and user input section 406 for receiving input from a user for workflow stages. GUI 400 may also display an overall indicator 408 that indicates whether a workflow has been completed.

Display module 106 may display representations of all stages in a workflow (e.g., stages 1-7 in multi-stage workflow 402, as shown in FIG. 4) and/or representations of a subset of stages of a workflow. For example, display module 106 may display representations of half of the stages of a workflow at a time, which may be useful in relatively long workflows (e.g., workflows with 20 or more steps).

As used herein, the phrase "representation of a workflow stage" generally refers to any visual indicator that shows a user how a workflow stage is related to at least one other workflow stage and/or a completion status of the workflow stage. In FIG. 4, workflow stages 1-7 are shown in sequential order for completing a parental-control settings wizard. Additionally or alternatively, a representation of a workflow stage may show the workflow stage as being in a loop of workflow stages, a cloud of workflow stages (e.g., in situations when an order in which the stages are completed may not be important), and/or in any other suitable configuration of workflow stages. A representation of a workflow stage may include one or more icons, pictures, letters, numbers, symbols, and/or any other visual representation of a workflow stage.

Each representation of a workflows stage in the plurality of stages may indicate a completion status of the workflow stage. Thus, display module 106 may display the representation of each workflow stage in a way that indicates to the user a completion status of the workflow stage. For example, display module 106 may display representations of incomplete workflow stages in red and representations of complete workflow stages in green. Display module 106 may also use any other suitable color scheme, size differentiation (e.g., icons of incomplete stages may be larger than icons of complete stages), text (e.g., text of a complete stage may be a different font than text of an incomplete stage), and/or any other visual representation to indicate to a user whether a workflow stage has been completed. In FIGS. 4 and 5, diagonal line fill in a workflow stage representation indicates that the workflow stage is complete, while vertical line fill indicates that the workflow stage is incomplete.

Once a user finishes a workflow stage, display module 106 may change a color, size, text, fill, and/or other visual attribute of a representation of the workflow stage to indicate to the user that the workflow stage is completed. Thus, a user may have a global and/or comprehensive view of the completion status of each stage (or a subset of stages) in a workflow.

At step 306 in FIG. 3, one or more of the systems described herein may receive, at a first stage in the multi-stage workflow, input from the user. For example, input module 108 (which may, as detailed above, represent a portion of system 100 in FIG. 1 and/or computing device 202 in FIG. 2) may receive input from the user at a first stage of the multi-stage workflow.

Input module 108 may receive any type or form of data relevant to a workflow stage on which a user is currently working. For example, input module 108 may receive communication from the user indicating that the user has completed the particular stage of the workflow. In other embodiments, as described above, the workflow stage may include a data field, a selection menu, and/or any other type of request for information that a user may need to provide and/or tasks that a user may need to complete to finish a workflow stage. Input module 108 may receive input from the user via a mouse, a keyboard, audio device, a visual device (e.g., a camera and/or video input device), and/or via any other suitable computer-input mechanism.

In some embodiments, prior to receiving input from the user at the first stage in the multi-stage workflow, input module 108 may receive input from the user at the second stage in the multi-stage workflow. In other words, the stage affected by the change in the first stage may have come before the first stage in the sequence of stages in the multi-stage workflow. The stage that comes before the first stage may have been completed by the user when the user entered the input at that stage, but additional input may be required at that stage based on the change to the first stage.

At step 308 in FIG. 3, one or more of the systems described herein may determine that the input from the user at the first stage affects a second stage in the multi-stage workflow. For example, determination module 110 (which may, as detailed above, be part of system 100 in FIG. 1 and/or server 206 in FIG. 2) may determine that the input from the user at stage 4 in multi-stage workflow 402 affects stages 2 and 6 of multi-stage workflow 402, as shown in FIG. 5.

Determination module 110 may determine that input from one stage affects another stage of the multi-stage workflow in a variety of different ways. For example, determination module 110 may determine that input at a first stage causes the second stage to be incomplete because further information may be required at the second stage. For example, FIG. 4 shows a user making changes to stage 4 in multi-stage workflow 402 that results in the need for new information to be entered into stage 2 and stage 6 of multi-stage workflow 402. In this example, a user changes an affected setting from Internet access to computer games in stage 4, and as a result the user may need to enter additional information about the computer games in stage 2. The user may also change a grade threshold from A to B, and may need to enter new information about a child's grades in stage 6.

As another example, determination module 110 may determine that input from the user at the first stage affects the second stage of the multi-stage workflow by determining that, in response to the information being received from the first stage, an additional stage needs to be added to the multi-stage workflow. Alternatively, determination module 110 may determine that, in response to input from the user at the first stage, the second stage of the multi-stage workflow should be removed from the multi-stage workflow.

While the foregoing examples explain simple dependencies between workflow stages, embodiments of the instant disclosure also encompass various workflow stage dependencies that may be more complex. For example, determination module 110 may determine that a change in one workflow stage affects an entire loop of a workflow, such that a user may need to revisit the entire loop (and/or iterate through the loop multiple times) of the workflow after making a change to the first stage of the workflow. An example of a workflow loop is a loop in a parental control wizard that gathers information for each child in a family, where each iteration through the loop gathers information on one child. In such embodiments, if a user adds a child at one stage of a workflow, the user may need to iterate through a loop of stages that gathers information about the child.

In other embodiments, determination module 110 may determine that a change to a first stage and/or information received at the first stage of the multi-stage workflow may result in the possibility of optional information being entered into other stages of the multi-stage workflow. Such optional changes may be visually represented differently than mandatory changes. For example, if a user makes a change in a first stage of a software installation configuration wizard to include an additional component of a software package, the wizard may determine that a second stage must be visited to establish mandatory configuration settings of the component and a third stage may optionally be visited to establish optional configuration settings of the component.

In some embodiments, in response to determining that the input from the user affects the second stage, determination module 110 may decide to inform the user of a sequence of stages that the user needs to revisit to complete the multi-stage workflow. In other words, determination module 110 may prompt display module 106 to display information (e.g., a pop-up window, a text box, etc.) that indicates which workflow stages a user must visit and/or the order in which a user must visit (or revisit) workflow stages that are affected by the user's input to the first workflow stage. For example, display module 106 may indicate that, in response to a user making a change to stage 10 in a workflow, the user needs to revisit stages 3, 7, 5, and 2 in that order.

At step 310 in FIG. 3, one or more of the systems described herein may, in response to determining that the input from the user affects the second stage, change a completion status of the second stage to an updated completion status. For example, update module 112 (which, may, as detailed above, be part of system 100 in FIG. 1 and/or server 206 in FIG. 2) may change a completion status of one or more stages affected by a change to a different stage in a multi-stage workflow.

Update module 112 may change a completion status of an affected stage of the workflow in a variety of ways. As discussed previously, a completion status may be changed to incomplete, may be changed to complete, may be changed by indicating that a workflow stage is no longer necessary, may be changed to indicate that a user may optionally enter information into the workflow stage, may be changed to indicate that a user is required to enter information into the workflow stage, and/or may be changed in any other suitable manner.

A change to one stage in a multi-stage workflow may cause a chain-reaction with respect to other stages in the workflow, and determination module 110 may detect such chain-reactions in advance. For example, determination module 110 may determine that a change in stage 6 of a multi-stage workflow may affect stage 2 of the multi-stage workflow. Determination module 110 may then determine that any change to stage 2 would affect stage 7. Determination module 110 may also determine that any change to stage 7 would affect stage 5. Thus, determination module 110 may determine that the change to stage 6 affects stages 2, 5, and 7 even though stages 5 and 7 are not directly impacted by the change to stage 6. In such embodiments, update module 112 may update the completion status of all of stages 2, 5, and 7 in response to the change to stage 6.

At step 312 in FIG. 3, one or more of the systems described herein may modify a representation of the second stage such that the representation of the second stage indicates to the user the updated completion status of the second stage. For example, display module 106 may modify a representation of stages 2 and 6 in workflow 402 to represent that a user needs to revisit stages 2 and 6.

Display module 106 may modify a representation of a workflow stage by changing any visual attribute of the workflow stage representation in a way that may indicate to a user that the completion status of the workflow stage has changed. For example, display module 106 may change the color, pattern, size, text, and/or any other visual attribute of the workflow stage representation to indicate to the user a changed completion status of the workflow stage. As shown in the example in FIG. 4, the representations of stages 2 and 6, as well as an overall workflow status indicator 408, may be changed in response to changes made by the user at stage 4.

According to various embodiments, display module 106 may modify a representation of a workflow stage by changing an order in which the workflow stage is displayed relative to other workflow stages. For example, representations of workflow stages are displayed in an order of 1-10. A user may make a change to stage 5 that requires to the user to visit stages 2, 7, and 4, in that order. As a result, display module 106 may reorder the representations of the workflow stages such that the representations of workflow stages 2, 7, and 4 follow stage 5 in the sequence of workflow stage representations. Similarly, representations of other workflow stages that were previously displayed after stage 5 (e.g., stages 6 and 8-10) may be displayed before stage 5 to indicate that the workflow stages do not need to be revisited.

In some embodiments, the updated completion status may indicate that a second stage is incomplete and the representation of the second stage, after being modified, my indicate to the user that the second stage is incomplete and should be visited by the user. Additionally or alternatively, determining that input from the user at the first stage affects the second stage in the multi-stage workflow may include determining, based on the input from the user, that the second stage should be added to the multi-stage workflow. In such embodiments, changing the completion status of the second stage may include adding the second stage to the multi-stage workflow and modifying the representation of the second stage may include adding the representation of the second stage to the representations of the plurality of stages of the multi-stage workflow such that the representation of the second stage is visible to the user via the GUI.

In at least one embodiment, determining that the input from the user at the first stage affects a second stage of the multi-stage workflow may include determining, based on input from the user, that the second stage should be removed from the multi-stage workflow. In such embodiments, changing the completion status of the second stage may include removing the second stage from the multi-stage workflow. Furthermore, modifying the representation of the second stage may include removing the representation of the second stage from the representations of the plurality of stages of the multi-stage workflow such that the representation of the second stage is no longer visible to the user via the GUI.

In some embodiments, the determination module may determine that the input from the user at the first stage affects the third stage in the multi-stage workflow. In such embodiments, the third stage may come after the first stage in the sequence of the multi-stage workflow and the second stage may come before the first stage in the sequence of the multi-stage workflow. Furthermore, update module 112 may be programmed to, in response to determining that the input from the user affects the third stage, change a completion status of the third stage to an updated completion status, and display module 106 may be programmed to, in response to changing the completion status of the third stage, modify a representation of the third stage such that the representation of the third stage indicates to the user the updated completion status of the third stage.

In some embodiments, the determination module may be programmed to determine that input from the user at the first stage affects a plurality of stages before the first stage in the sequence of the multi-stage workflow and a plurality of stages after the first stage in the sequence of the multi-stage workflow. In such embodiments, update module 112 may be programmed to, in response to determining that the input from the user affects the plurality of stages before and after the first stage, change a completion status of each of the stages in the plurality of stages before and after the first stage to the updated completion status. Also, display module 106 may, in response to update module 112 changing the completion status of each of the stages in the plurality of stages, modify a representation of each of the stages in the plurality of stages such that the representations of each stage in the plurality of stages indicates to the user the updated completion status of each of the stages in the plurality of stages.

In at least one example, determination module 110 may determine that the input from the user at the first stage completes the first stage. In response to determination module 110 determining that the input from the user completes the first stage, update module 112 may change a completion status of the first stage to completed. In response to changing the completion status of the first stage to completed, display module 106 may modify a representation of the first stage such that the representation of the first stage indicates to the user the completed status of the first stage (e.g., display module 106 may change a color of the representation of the first stage from red to green).

Continuing with the previous example, display module 106 may modify the representation of the second stage by changing the representation of the second stage to a first color that indicates that the second stage was previously visited by the user but needs to be revisited by the user. For example, display module 106 may change a color of the representation of the second stage from green to orange, where the color green indicated that the stage was completed and the color orange indicates that the second stage was previously visited but needs to be revisited. In this example, representations of stages that have not been visited and have not been completed may be red.

Figure 6:
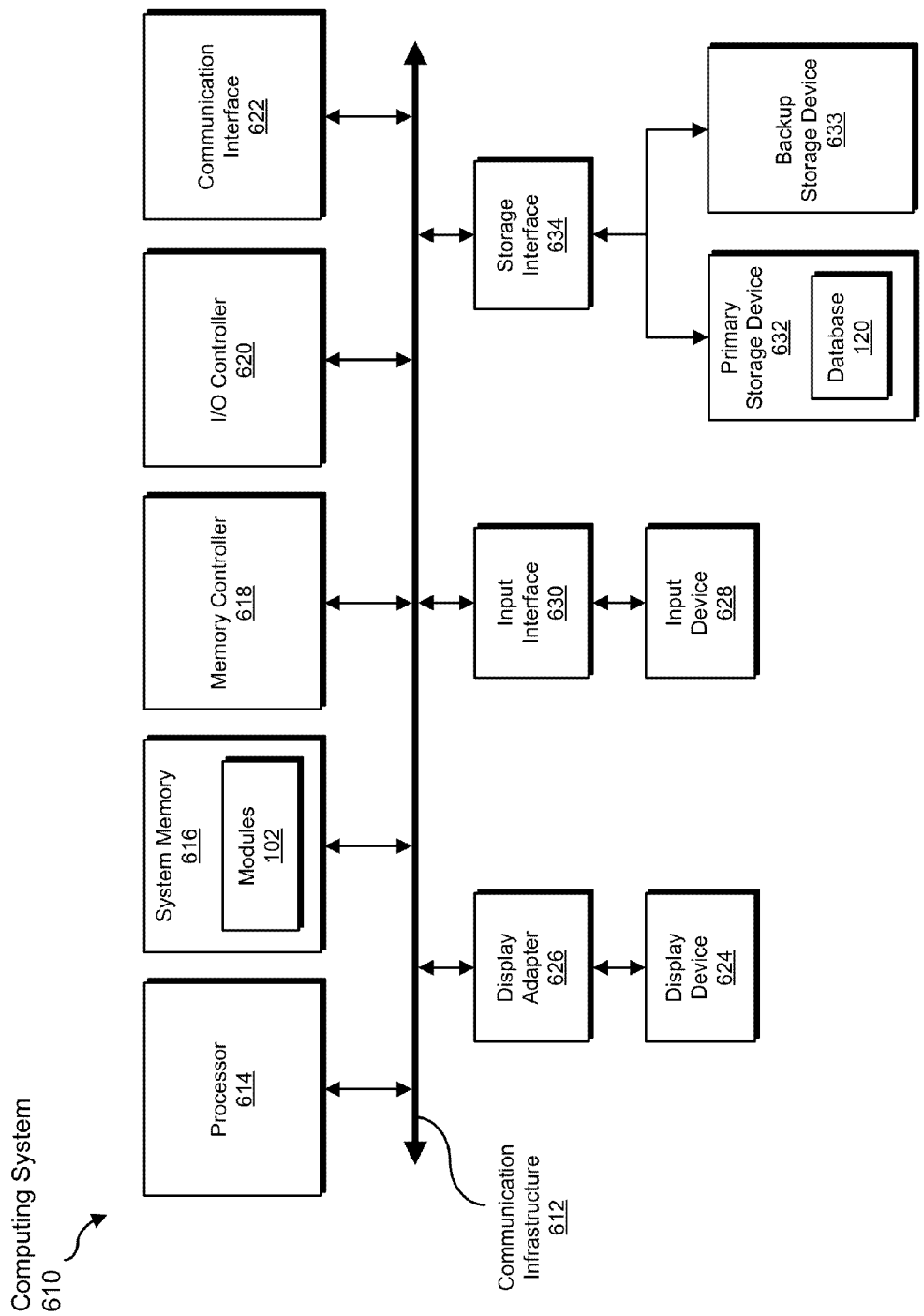
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 410 may perform and/or be a means for performing, either alone or in combination with other elements, one or more of the managing, displaying, receiving, determining, changing, modifying, adding, removing, and informing steps described herein. All or a portion of computing system 410 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions.

Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
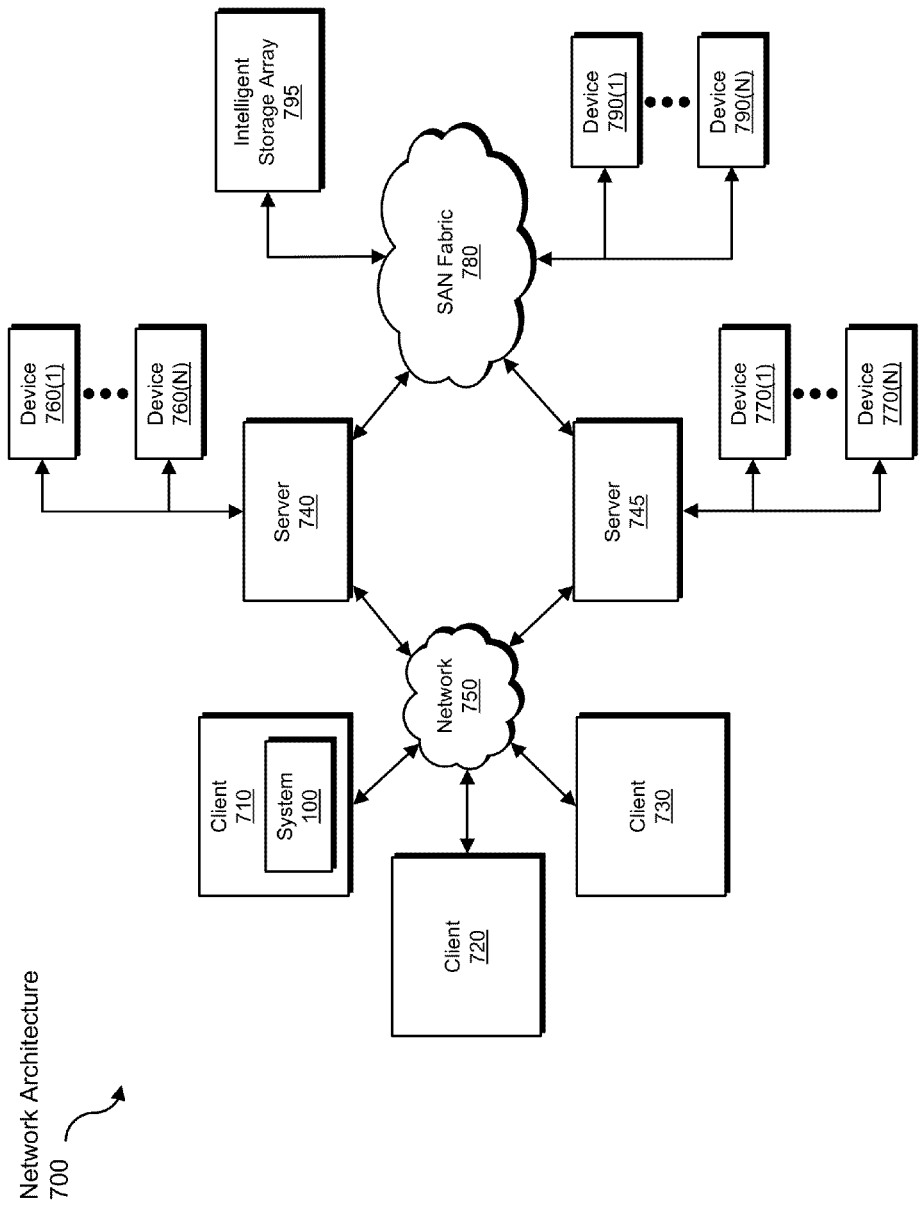
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the managing, displaying, receiving, determining, changing, modifying, adding, removing, and informing steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for managing workflows.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a GUI by changing a representation of a workflow stage in response to user input received at a different workflow stage.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing workflows, at least a portion of the method being performed by a computing device comprising at least one processor, the method comprising:
    managing a multi-stage workflow that presents a user with a plurality of sequential stages to be completed by the user;
    displaying representations of the plurality of stages of the multi-stage workflow to the user via a Graphical User Interface (GUI), each representation of a workflow stage from the plurality of stages indicating a completion status of the workflow stage;
    receiving, at a first stage in the multi-stage workflow, input from the user;
    updating, in response to receiving the input from the user at the first stage, the completion status of one or more additional stages in the multi-stage workflow by:
        determining that the input from the user at the first stage affects the completion status of a second stage in the multi-stage workflow,
        in response to determining that the input from the user at the first stage affects the completion status of the second stage, changing the completion status of the second stage, wherein changing the completion status comprises changing a current complete status to an incomplete status;
        in response to changing the completion status of the second stage, modifying a representation of the second stage such that the representation of the second stage indicates to the user the updated completion status of the second stage.

2. The method of claim 1, wherein changing the completion status of the second stage further comprises at least one of:
    changing the completion status to indicate that the user can optionally enter additional input at the second stage;
    changing the completion status to indicate that the user is required to enter additional input at the second stage.

3. The method of claim 1, wherein receiving input from the user is the result of at least one of:
    the user entering information into a data field;
    the user choosing one or more of a plurality of selections requested by the workflow stage;
    the user performing a physical task and providing input to the workflow stage indicating that the task was completed.

4. The method of claim 1, wherein modifying the representation of the second stage comprises changing an order in which the second stage is displayed relative to other workflow stages.

5. The method of claim 1, further comprising:
    determining that the input from the user at the first stage causes a chain-reaction with respect to other stages in the workflow by:
        determining that the input from the user at the first stage affects the completion status of the second stage such that the second stage requires additional input;
        determining that the additional input to the second stage affects a completion status of one or more additional stages;
    in response to determining that the input from the user at the first stage causes the chain-reaction, updating the completion status of the one or more additional stages.

6. The method of claim 5, further comprising:
    determining that the input from the user at the first stage affects the completion status of a third stage in the multi-stage workflow, wherein the third stage comes after the first stage in a sequence of the multi-stage workflow and the second stage comes before the first stage in the sequence of the multi-stage workflow;
    in response to determining that the input from the user at the first stage affects the completion status of the third stage, changing the completion status of the third stage to an updated completion status;
    in response to changing the completion status of the third stage, modifying a representation of the third stage such that the representation of the third stage indicates to the user the updated completion status of the third stage.

7. The method of claim 6, further comprising:
    determining that the input from the user at the first stage affects a completion status of each stage in a plurality of stages before the first stage in the sequence of the multi-stage workflow and a completion status of each stage in a plurality of stages after the first stage in the sequence of the multi-stage workflow, wherein:
        determining that the input from the user at the first stage affects the completion status of each of the stages in the plurality of stages before the first stage comprises determining that the input from the user at the first stage affects the completion status of the second stage;
        determining that the input from the user at the first stage affects the completion status of each of the stages in the plurality of stages after the first stage comprises determining that the input from the user at the first stage affects the third stage;

in response to determining that the input from the user at the first stage affects the completion status of each of the stages in the plurality of stages before and after the first stage, changing the completion status of each of the stages in the plurality of stages before and after the first stage to the updated completion status, wherein changing the completion status of each of the stages in the plurality of stages comprises changing the completion status of the second and third stages;

in response to changing the completion status of each of the stages in the plurality of stages, modifying a representation of each of the stages in the plurality of stages such that the representations of each stage in the plurality of stages indicate to the user the updated completion status of each of the stages in the plurality of stages, wherein modifying the representation of each of the stages in the plurality of stages comprises modifying the representations of the second and third stages.

8. The method of claim 1, further comprising:
in response to determining that the input from the user at the first stage affects the completion status of the second stage, informing the user of a sequence of stages that the user needs to revisit to complete the multi-stage workflow, wherein:
the sequence of stages identifies the second stage;
the sequence of stages identifies an order in which the user should revisit the stages identified in the sequence of stages.

9. The method of claim 1, further comprising:
determining that the input from the user at the first stage completes the first stage;
in response to determining that the input from the user at the first stage completes the first stage, changing a completion status of the first stage to completed;
in response to changing the completion status of the first stage to completed, modifying a representation of the first stage such that the representation of the first stage indicates to the user the completed status of the first stage.

10. The method of claim 9, wherein:
modifying the representation of the second stage comprises changing the representation of the second stage to a first color that indicates that the second stage was previously visited by the user but needs to be revisited by the user;
modifying the representation of the first stage comprises changing the representation of the first stage to a second color that indicates that the first stage is completed;
a representation of a third stage comprises a third color that indicates the third stage has not been visited by the user and is not completed.

11. A system comprising a computing device for managing workflows, the computing device comprising:
a management module programmed to manage a multi-stage workflow that presents a user with a plurality of sequential stages to be completed by the user;
a display module programmed to display representations of the plurality of stages of the multi-stage workflow to the user via a Graphical User Interface (GUI), each representation of a workflow stage from the plurality of stages indicating a completion status of the workflow stage;
an input module programmed to receive, at a first stage in the multi-stage workflow, input from the user;

a determination module programmed to determine that the input from the user at the first stage affects the completion status of a second stage in the multi-stage workflow;
an update module programmed to update, in response to receiving the input from the user, the completion status of one or more additional stages in the multi-stage workflow by:
in response to determining that the input from the user at the first stage affects the completion status of the second stage, changing the completion status of the second stage, wherein:
changing the completion status comprises changing a current complete status to an incomplete status;
the display module is further programmed to, in response to the update module changing the completion status of the second stage, modify a representation of the second stage such that the representation of the second stage indicates to the user the updated completion status of the second stage.

12. The system of claim 11, wherein the update module is further programmed to change the completion status of the second stage by performing at least one of:
changing the completion status to indicate that the user can optionally enter additional input at the second stage;
changing the completion status to indicate that the user is required to enter additional input at the second stage.

13. The system of claim 11, wherein the input module is programmed to receive input from the user as a result of at least of one:
the user entering information into a data field;
the user choosing one or more of a plurality of selections requested by the workflow stage;
the user performing a physical task and providing input to the workflow stage indicating that the task was completed.

14. The system of claim 11, wherein the update module is programmed to modify the representation of the second stage by changing an order in which the second stage is displayed relative to other workflow stages.

15. The system of claim 11, wherein:
the determination module is programmed to determine that the input from the user at the first stage causes a chain-reaction with respect to other stages in the workflow by:
determining that the input from the user at the first stage affects the completion status of the second stage such that the second stage requires additional input;
determining that the additional input to the second stage affects a completion status of one or more additional stages;
the update module is programmed to update the completion status of the one or more additional stages in response to determining that the input from the user at the first stage causes the chain-reaction.

16. The system of claim 15, wherein:
the determination module is programmed to determine that the input from the user at the first stage affects the completion status of a third stage in the multi-stage workflow, wherein the third stage comes after the first stage in a sequence of the multi-stage workflow and the second stage comes before the first stage in the sequence of the multi-stage workflow;
the update module is programmed to, in response to determining that the input from the user at the first stage affects the completion status of the third stage, change the completion status of the third stage to an updated completion status;

the update module is programmed to, in response to changing the completion status of the third stage, modify a representation of the third stage such that the representation of the third stage indicates to the user the updated completion status of the third stage.

17. The system of claim 16, wherein:
the determination module is programmed to determine that the input from the user at the first stage affects a completion status of each stage in a plurality of stages before the first stage in the sequence of the multi-stage workflow and a completion status of each stage in a plurality of stages after the first stage in the sequence of the multi-stage workflow;
the update module is programmed to, in response to determining that the input from the user at the first stage affects the completion status of each of the stages in the plurality of stages before and after the first stage, change the completion status of each of the stages in the plurality of stages before and after the first stage to the updated completion status;
the update module is programmed to, in response to changing the completion status of each of the stages in the plurality of stages, modify a representation of each of the stages in the plurality of stages such that the representations of each stage in the plurality of stages indicate to the user the updated completion status of each of the stages in the plurality of stages.

18. The system of claim 11, wherein the management module is programmed to, in response to determining that the input from the user at the first stage affects the completion status of the second stage:
inform the user of a sequence of stages that the user needs to revisit to complete the multi-stage workflow, wherein:
the sequence of stages identifies the second stage;
the sequence of stages identifies an order in which the user should revisit the stages identified in the sequence of stages;
modify an overall workflow status indicator to indicate that the multi-stage workflow is incomplete.

19. The system of claim 11, wherein:
the updated completion status of the second stage indicates that a loop of sequential stages in the multi-stage workflow is incomplete;
the representations of each stage in the sequential stage are modified to indicate to the user that the loop of sequential stages is incomplete and needs to be revisited.

20. A computer-readable-storage medium comprising one or more computer-executable instructions that, when executed by at least one processor of a computing device, cause the computing device to:
manage a multi-stage workflow that presents a user with a plurality of sequential stages to be completed by the user;
display representations of the plurality of stages of the multi-stage workflow to the user via a Graphical User Interface (GUI), each representation of a workflow stage from the plurality of stages indicating a completion status of the workflow stage;
receive, at a first stage in the multi-stage workflow, input from the user;
update, in response to receiving the input from the user at the first stage, the completion status of one or more additional stages in the multi-stage workflow by:
determining that the input from the user at the first stage affects the completion status of a second stage in the multi-stage workflow;
in response to determining that the input from the user at the first stage affects the completion status of the second stage, changing the completion status of the second stage to an updated completion status, wherein changing the completion status comprises changing a current complete status to an incomplete status;
in response to changing the completion status of the second stage, modifying a representation of the second stage such that the representation of the second stage indicates to the user the updated completion status of the second stage.

* * * * *

UNITED STATES PATENT AND TRADEMARK OFFICE
CERTIFICATE OF CORRECTION

PATENT NO. : 8,732,568 B1  
APPLICATION NO. : 13/233255  
DATED : May 20, 2014  
INVENTOR(S) : Sinoj Mullangath Page 1 of 1

It is certified that error appears in the above-identified patent and that said Letters Patent is hereby corrected as shown below:

In the Claims:

Claim 13 at column 20, lines 27 to 29, should read:

The system of claim 11, wherein the input module is programmed to receive input from the user as a result of at least one of:

Signed and Sealed this
Fourteenth Day of October, 2014

Michelle K. Lee
*Deputy Director of the United States Patent and Trademark Office*